Nov. 13, 1934.    H. F. LEOPOLD    1,980,489
UPHOLSTERING COVER
Filed March 30, 1934
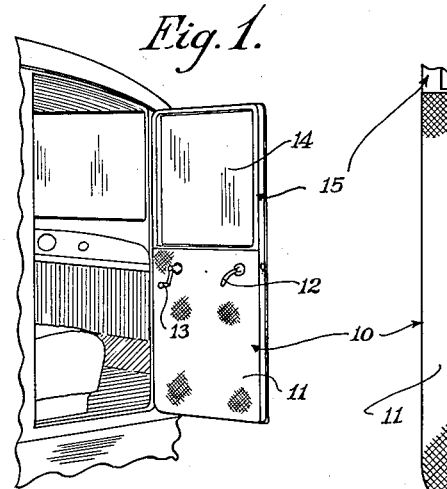
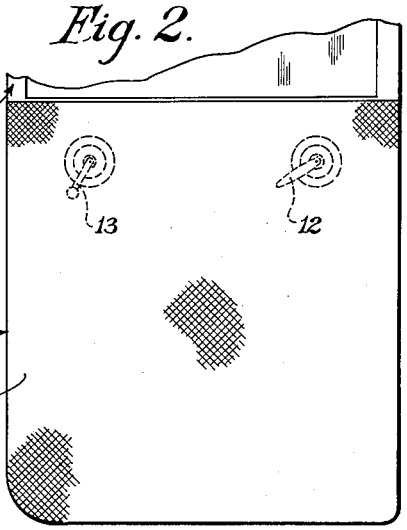
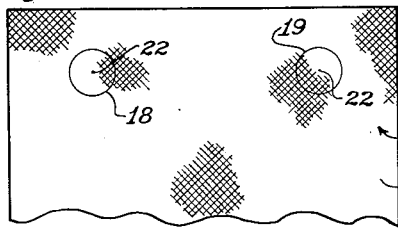
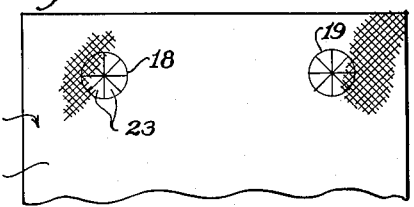
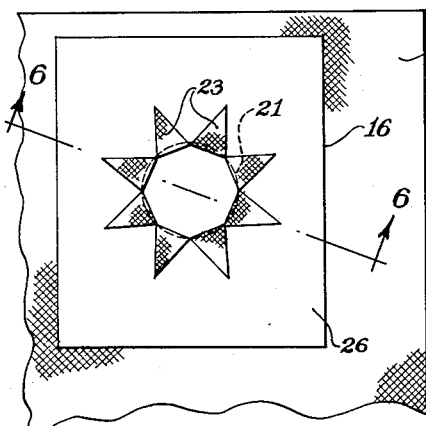
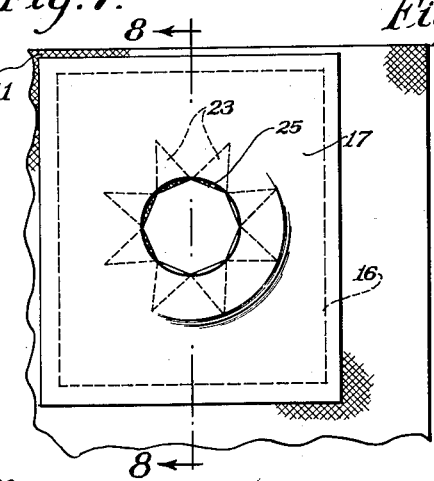
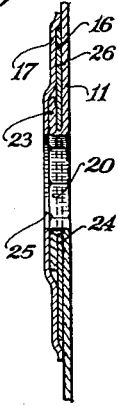
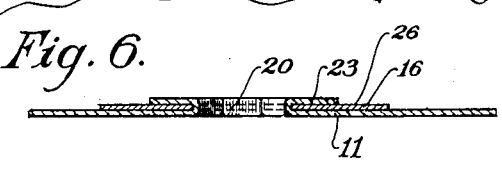
Howard F. Leopold
Inventor
By: Threely and Cannon
His Attorneys Patented Nov. 13, 1934

1,980,489

UNITED STATES PATENT OFFICE 1,980,489

UPHOLSTERING COVER

Howard F. Leopold, Chicago, Ill.

Application March 30, 1934, Serial No. 718,156

3 Claims. (Cl. 45—138)

This invention relates to upholstery covers. It is an object of this invention to provide an improved upholstery cover which is relatively simple and inexpensive in construction and efficient in use.

Prior to my invention it was the common practice in vending upholstery covers for automobiles or like vehicles to locate and form in such covers the necessary openings for the passage of the door handle, window operating lever, or other protruding members from the wall of which the cover is intended to be disposed.

In many instances the location of the openings herein referred to were found not to correspond with the location of the handle or window operating arm or other protruding parts from the wall, and as a consequence it necessitated the purchaser's recutting or relocating such openings. Not being equipped with the proper facilities for accomplishing this the cover invariably was either incorrectly mounted in position or ruined. It is, therefore, one of the many objects of my invention to provide an improved upholstery cover especially designed for use on automobile vehicle doors and other wall portions of the vehicle, and in which cover there is provided a simple and expeditious means and method of properly locating openings for the projection of the projecting parts or elements of the door or other wall portions of the vehicle.

Another object of the invention is to provide an upholstery cover which can be expeditiously mounted in position by one other than a skilled mechanic without the requirement of numerous or expensive tools or implements.

Another object of the invention is to provide a new and efficient method for forming and re-enforcing the necessary holes in the upholstery cover to accommodate the inside handle and window operating crank of an automotive vehicle door.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a fragmentary perspective view of a typical automotive vehicle illustrating a preferred form of one of the new upholstery covers applied to the door thereof;

Fig. 2 is a fragmentary elevational view of the door shown in Fig. 1, as seen from the inside thereof;

Fig. 3 is a fragmentary elevation of one of the new upholstery covers illustrating the first step of the new method in fitting and accommodating the same to an automotive vehicle door;

Fig. 4 is a fragmentary elevation of one of the new upholstery covers illustrating the second step in the new method of fitting and accommodating the same to the vehicle door;

Fig. 5 is an enlarged fragmentary elevation illustrating the third step in the new method;

Fig. 6 is a sectional view on line 6—6 in Fig. 5;

Fig. 7 is an enlarged fragmentary elevation illustrating the fourth and final step in the new method; and Fig. 8 is a sectional view on line 8—8 in Fig. 7.

A preferred form of the new upholstery cover is generally indicated at 10 in the drawing. The cover 10 includes a sheet 11 which may be made of any suitable flexible material, such, for example, as fabric. The new upholstery cover 10 is shown in a typical use thereof, namely, as applied to a conventional automotive vehicle door 15 which is provided on its inner side with a door handle 12 and a crank 13 for operating the glass 14 of the door window.

The new upholstery cover includes a pair of reenforcing elements 16 and 17 for re-enforcing the portions of the fabric sheet 11 which define the marginal edges of holes 18 formed in the fabric sheet 11, in a manner presently to be described, for the reception of the door handle 12 and window operating crank 13; and in practising the invention the new upholstery cover sheet 11 and the reenforcing elements 16 and 17 are sold to the buyer as one unit or one package, with the center marks 22 (Fig. 3) inscribed on the fabric cover sheet by the manufacturer. These center marks correspond to the centers of the studs or axes about which the door handle 12 and the window operating crank 13 are rotatable.

Using the marks 22 as centers the purchaser inscribes the circles 18 and 19 on the fabric upholstery cover sheet 11 so as to indicate the size and positions of holes 20 to be formed in the upholstery cover sheet 11 so that the door handle 12 and the window operating crank 13 may be projected therethrough when the upholstery cover sheet 11 is positioned upon the vehicle door 15.

The inscription of the circles 18 and 19 on the upholstery cover 11 is accomplished by placing upon the cover 11, over each of the center marks 22, a reenforcing element 16 which has the form of a sheet of flexible material, such, for example, as a relatively strong paper or the like, having an adhesive coating 26 on one surface and having a circular opening 21 formed therein and the size of the circles 18 and 19; the sheets 16 being laid upon the upholstery sheet 11 in such a position that the center marks 22 are concentric with the centers of the circular openings 21 in the sheets 16. Thereupon, by means of a suitable writing instrument, the purchaser inscribes the circles 18 and 19 on the upholstery cover sheet 11 by drawing around the marginal edges of the circular openings 21 in the reenforcing sheets 16.

In executing the next step the circular areas 18 and 19 of the fabric upholstery sheet 11 are cut into sector portions 23, whereupon the adhesive surfaces 26 of the reenforcing sheets 16 are moistened and the sheets 16 are placed over the thus divided and cut circular areas 18 and 19 in such a position that the centers of the circular openings 21 in the sheets 16 are concentric with the center marks 22. The sector portions 23 of the upholstery cover sheet 11 are then folded over onto and secured to the adhesive surfaces 26 of the sheets 16. (Figs. 5 and 6).

Finally a second reenforcing element 17 in the form of a sheet of relatively strong paper or analogous flexible material, which is somewhat larger in area than the sheets 16 and is provided with an adhesively coated surface 24 and a circular opening 25, is placed over the adhesive surface 26 of each of the sheets 16 and corresponding sector portions 23 in such a position that the centers of the circular openings 21 and 25 are concentric. The reenforcing sheets 17 are then adhesively secured to the adhesive surfaces 26 of the reenforcing sheets 16 and to the sector portions 23, while at the same time the marginal portions of the adhesive surfaces 24 of the reenforcing sheets 17 are secured to the fabric upholstery cover sheet 11, thus reenforcing the circular openings 20 formed in the upholstery cover sheet 11 and preventing the same from unraveling and becoming frayed and worn when in use.

The upholstery cover thus completed is then placed over the upholstery of the door 15 with the door handle 12 and the window-operating crank 13 projected through the corresponding reenforced openings 20 thus provided therefor in the upholstery cover sheet 11.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An upholstery cover comprising a sheet of flexible material having a series of sector portions formed therein providing a circular opening for the reception of a member projecting from the upholstery over which said cover may be arranged, a reenforcing member arranged upon said sheet around the perimeter of said opening and having said sector portions secured thereto, and a second reenforcing member arranged over said sector portions and first-named reenforcing member and secured to said sheet.

2. An upholstery cover comprisng a sheet of flexible material having a series of sector portions formed therein providing a circular opening for the reception of a member projecting from the upholstery over which said cover may be arranged, a reenforcing member arranged upon said sheet around the perimeter of said opening and having said sector portions secured thereto, and a second reenforcing member arranged around the perimeter of said opening over said sector portions and first-named reenforcing member and secured thereto.

3. An upholstery cover comprising a sheet of flexible material having a series of sector portions formed therein providing a circular opening, a reenforcing member arranged upon said sheet around the perimeter of said opening and having said sector portions adhesively secured thereto, and a second reenforcing member arranged around the perimeter of said opening over said sector portions and first-named reenforcing member and adhesively secured thereto and to said sheet.

HOWARD F. LEOPOLD.